May 14, 1940.  W. H. SCHEIDT  2,200,899
SPACING MEANS FOR BAG FILTERS
Filed Nov. 12, 1937

W. H. Scheidt,
INVENTOR
By: Glascock Downing+Seebold
Attys.

Patented May 14, 1940

2,200,899

UNITED STATES PATENT OFFICE 2,200,899

SPACING MEANS FOR BAG FILTERS

Wilhelm Heinrich Scheidt, Wuppertal-Elberfeld, Germany

Application November 12, 1937, Serial No. 174,274
In Germany August 24, 1937

4 Claims. (Cl. 210—195)

In chemical apparatus the use of chains for separating and spacing purposes have proved particularly satisfactory. Thus, for instance, the use of chains in spacing elements of bag filters is of particular advantage, as chains form particularly good channels for the filtrate.

The employment of chains as spacing elements presents difficulties, however, where all parts which come in contact with the material to be filtered, and therefore the chains as well, must consist of material which will not corrode, more particularly of non-metallic material, such as rubber, artificial material or the like. Such chains acting as spacing elements must besides the requisite resistance to corrosion, have sufficient rigidity or strength so as not to be liable to become deformed or even destroyed by the mechanical tension and compressive stresses to which they are subjected during the starting up, operation and cleansing of the apparatus.

It has already been proposed to make such chains for instance of rubbered wire or of wire coated with artificial resin. A chain made in this way consists like any ordinary chain of separate links, each of which has first to be bent or knotted together from a for instance rubbered piece of wire. Notwithstanding due regard being given to the requisite gauge of wire and hardness of wire and rubber, it nevertheless frequently occurs in chains made in this way that the rubber layer breaks at the bent places, so that the required resistance to corrosion frequently breaks down unnoticed during operation. Further disadvantages are the waste which occurs and the necessity that the places where the wire of the individual chain links is cut through shall be capable of being and must subsequently be individually rubbered or coated with artificial resin after the completion of the finished chain.

The present invention relates to the employment of chain-like structures which are produced from a continuous cord-like material, the cross-section of which corresponds approximately to that of the wire material commonly used for such chains, by forming a series of knots.

Such chains may for instance be made without difficulty from solid rubber cord which is vulcanised to a greater or less extent or from a wire or binding cord coated with a layer of rubber or artificial material, such wire being for instance finely braided so as to give it sufficient elasticity, or from any material which is of a more or less elastic nature and is suitably resistant to corrosion.

A constructional example of the arrangement according to the invention is illustrated in the accompanying drawing.

Figure 1:
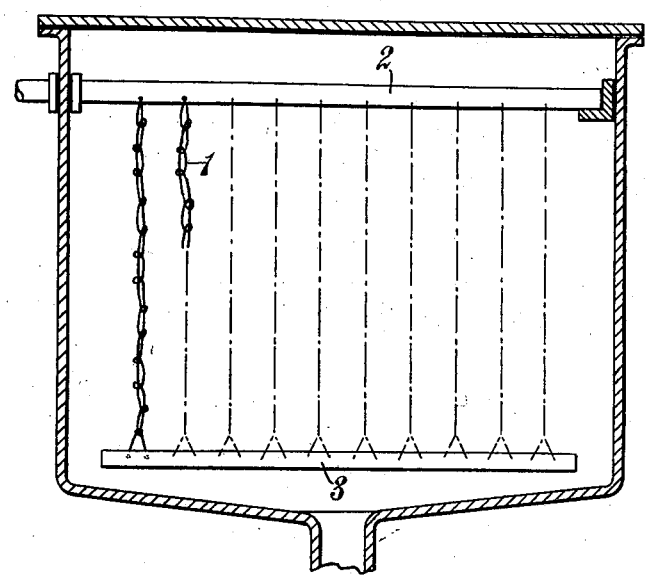
Figure 1 is a cross-section of a filtering apparatus employing the chain-like structure according to the invention.
Figure 2:
Figure 2 is a side view of one of the chain-like elements.
Figure 3:
Figure 3 shows the formation of the chain on a larger scale.

A chain according to the invention consists in the first place of a running end of rubber cord I of a certain length. This cord is drawn in such a manner for instance through a hole in the upper horizontal member 2 of a filter frame which is to receive the separate spacing chains that on either side half the length of the rubber cord will hang down freely.

To this single hole in the upper member of the filter frame correspond two adjacent holes in the lower horizontal member 3 of the filter frame. This lower member of the filter frame has a U-shaped profile, the opening of which faces the upper member of the filter frame.

The two freely depending ends of the rubber cord are knotted, for instance by hand, with another as many times as chain links are desired. For this purpose a suitable auxiliary device may be employed.

During the knotting it may be of advantage to keep the two free rubber cord ends under slight tension with the object of obtaining from the start the correct distancing and setting of the individual knots.

After the last knot has been formed the remaining two free short ends of the rubber cord are drawn from the outside inwards through the two holes in the lower U-shaped frame member and each end is simply knotted independently. These two terminal knots prevent any slipping back out of the two holes. As these terminal knots are disposed on the inside of the U-shaped frame member, they present no obstacle in any way, if the filter frame is for instance made to fold together.

The total length of the rubber cord required for producing such a chain is purposely made somewhat short, so that the finished chain will be permanently under tension. This not only ensures the permanent position of the individual chain links or of the individual knots forming them, which would otherwise slip in view of the elasticity of the material, as well as the security of the two terminal knots in the lower frame member, but have the further great advantage, that adjacent chain links will lie in planes of 45° to one another, so that such a chain provides, just like a normal chain of wire, drainage passages of a particularly effective shape and of a particularly favourable cross-section for the filtrate.

The applicability of such chain-like structures according to the invention is by no means limited to filters of the bag filter type, which are mentioned by way of example, but extends to many other apparatus, for instance conveying and drying belts, lixiviating and treating apparatus and the like, in which case the upper and lower horizontal members of a filter frame referred to in the specification will be replaced by suitable similar bounding and tensioning bars or similar devices.

What I claim is:

1. Spacing means for bag filters, comprising in combination, a fixed support, a plurality of continuous lengths of elastic material secured midway between their ends to said support with the portions of each length of material on either side of said support hitched together at intervals so as to form a looped chain-like structure, and a second fixed support spaced from said first-mentioned support, the free ends of each length of material being fixed to said second support with the looped structure under tension.

2. Spacing means for bag filters, comprising in combination, a fixed support, a plurality of continuous lengths of elastic cord secured midway between their ends to said support with the portions of each length of cord on either side of said support hitched together at intervals so as to form a looped chain-like structure, and a second fixed support spaced from said first-mentioned support, the free ends of each length of cord being fixed to said second support with the looped structure under tension.

3. Spacing means for bag filters, comprising in combination, a fixed support, a plurality of continuous lengths of non-corrodible-elastic material secured midway between the ends to said support with the portions of each length of material on either side of said support hitched together at intervals so as to form a looped chain-like structure, and a second fixed support spaced from said first-mentioned support, the free ends of each length of material being fixed to said second support with the looped structure under tension.

4. Spacing means for bag filters, comprising in combination, a fixed supporting bar, a plurality of lengths of elastic material secured midway between their ends to said bar with the portions of each length of material on either side of said bar hitched together at intervals so as to form a looped chain-like structure, and a second bar of U-shaped cross-section spaced from said first-mentioned bar with its open side facing the first-mentioned bar, the free ends of each length of material being fixed to said second bar with the looped structure under tension.

WILHELM HEINRICH SCHEIDT.